US006704028B2

(12) United States Patent
Wugofski

(10) Patent No.: US 6,704,028 B2
(45) Date of Patent: Mar. 9, 2004

(54) SYSTEM FOR USING A CHANNEL AND EVENT OVERLAY FOR INVOKING CHANNEL AND EVENT RELATED FUNCTIONS

(75) Inventor: Theodore D. Wugofski, Fort Worth, TX (US)

(73) Assignee: Gateway, Inc., Poway, CA (US)

(*) Notice: Subject to any disclaimer, the term of this patent is extended or adjusted under 35 U.S.C. 154(b) by 0 days.

(21) Appl. No.: 09/002,987

(22) Filed: Jan. 5, 1998

(65) Prior Publication Data
US 2002/0108110 A1 Aug. 8, 2002

(51) Int. Cl.[7] .............................. H04N 5/445; G06F 3/00
(52) U.S. Cl. ............................ 345/719; 725/39; 725/40; 725/42
(58) Field of Search ........................... 348/906, 552, 348/553, 563, 564, 569, 570, 10, 12, 7; 345/327, 719, 720, 721, 779, 810, 841; 725/10, 12, 14, 25, 39, 40, 42, 46, 43

(56) References Cited

U.S. PATENT DOCUMENTS

| 5,353,121 A | * | 10/1994 | Young et al. ................ 348/563 |
| 5,382,983 A | * | 1/1995 | Kwoh et al. ................ 348/716 |
| 5,539,822 A | | 7/1996 | Lett ............................ 380/20 |
| 5,550,575 A | * | 8/1996 | West et al. ................ 348/5.5 |
| 5,594,509 A | * | 1/1997 | Florin et al. ................ 348/731 |
| 5,596,373 A | * | 1/1997 | White et al. ................ 348/569 |
| 5,751,335 A | * | 5/1998 | Shintani ...................... 348/5.5 |
| 5,828,402 A | * | 10/1998 | Collings ...................... 348/5.5 |
| 5,907,323 A | * | 5/1999 | Lawler et al. ............... 345/327 |
| 5,933,141 A | * | 8/1999 | Smith .......................... 345/339 |
| 5,940,073 A | * | 8/1999 | Klosterman et al. ........ 345/327 |
| 6,003,041 A | * | 12/1999 | Wugofski .................... 707/104 |
| 6,025,837 A | * | 2/2000 | Matthews, III et al. ..... 345/327 |
| 6,037,933 A | * | 3/2000 | Blonstein et al. ........... 345/327 |
| 6,147,714 A | * | 11/2000 | Terasawa et al. ........... 348/564 |
| 6,469,753 B1 | * | 10/2002 | Klosterman et al. |

FOREIGN PATENT DOCUMENTS

EP          0721253          7/1996

* cited by examiner

Primary Examiner—Vivek Srivastava
Assistant Examiner—Kieu-Oanh Bui
(74) Attorney, Agent, or Firm—Scott Charles Richardson; Rodney L. Lacy; Schwegman, Lundberg, Woessner & Kluth

(57) ABSTRACT

A convergence system suitable for accepting inputs from several television or personal computing sources is disclosed. The sources can be output on a display. The convergence system is controlled by a multi-function controller suitable for providing a set of function commands. A processor is coupled to the inputs, display and operably coupled to the controller wherein the processor responds to the function commands provided by the controller. The processor also creates for output on the display a set of channel banners. At least one of the channel banners provides information on available processor functions and provides video feed-back when the processor is responding to the function commands.

20 Claims, 9 Drawing Sheets

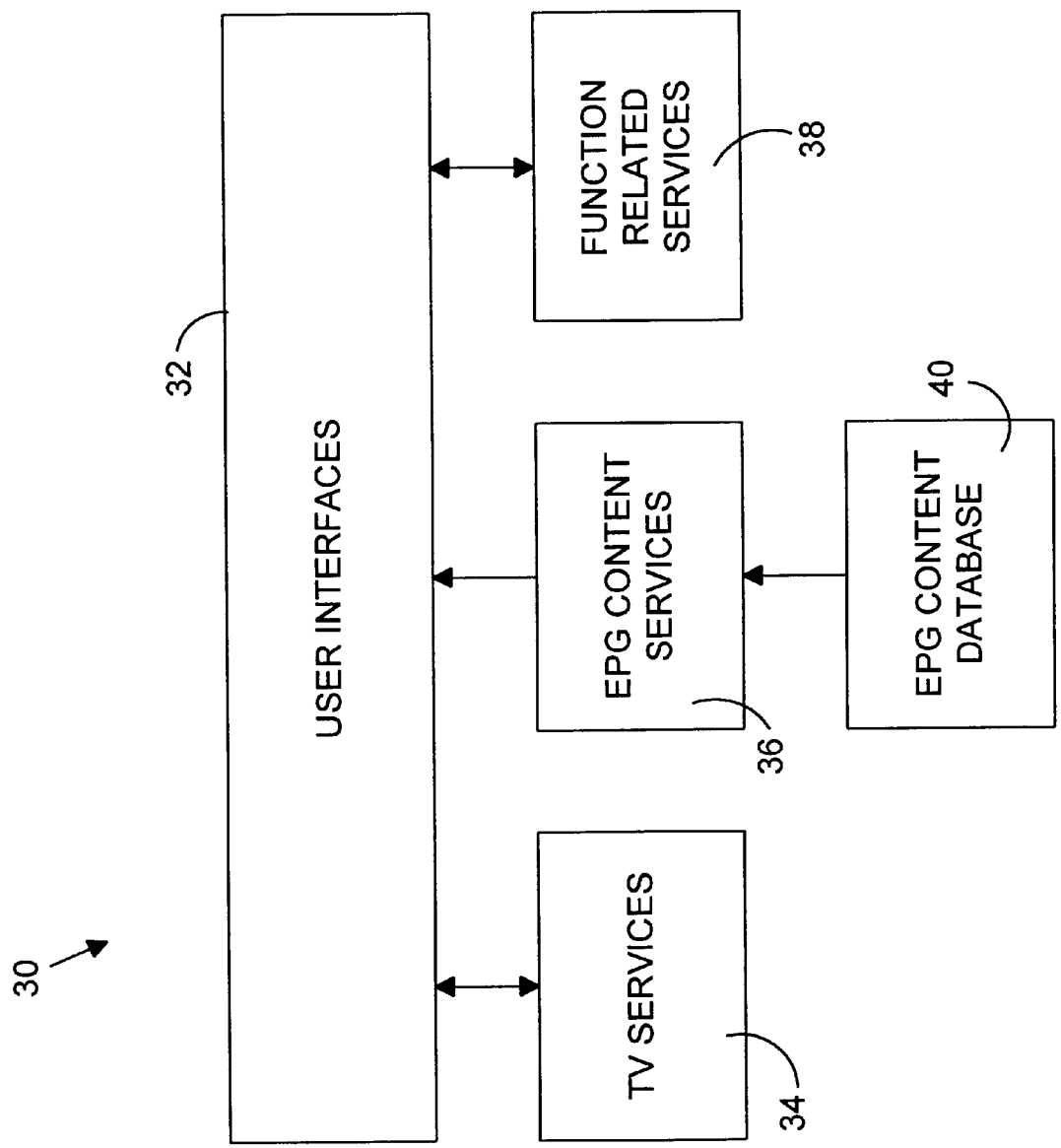

SYSTEM FOR USING A CHANNEL AND EVENT OVERLAY FOR INVOKING CHANNEL AND EVENT RELATED FUNCTIONS

RELATED APPLICATIONS

This application relates to the following co-pending, co-filed, and co-assigned applications: "Multipurpose Channel Banner," Ser. No. 09/002,733 filed Jan. 5, 1998; "Controlling the Layout of Graphics in a Television Environment," Ser. No. 09/002,994 filed Jan. 5, 1998; "Displaying Layered Information Using Lenticular-Like Interfaces," Ser. No. 09/002,600 filed Jan. 5, 1998; and U.S. Pat. No. 5,933,141, entitled "Mutably Transparent Displays," filed Jan. 5, 1998; all of which are hereby incorporated by reference.

BACKGROUND

The present invention relates to convergence systems. Specifically, the present invention relates to the convergence system itself and its associated software.

A convergence system refers to a system that includes capabilities that are otherwise provided by separate systems. For example, the Gateway Destination PC/TV system provides for both computer and television capability. Multiple devices and inputs are brought together in one system which typically makes use of one display. For example, at its most basic level, a user of a convergence system may alternate between television programming and a computer program on a particular video monitor. Typically, however, a convergence system brings together several television inputs such as radio-frequency, satellite, cable, or digital television. In addition to running computer programs, a convergence system may access a wide area network such as the Internet. The convergence system may also bring together several consumer electronic devices such as video cassette recorders, laser disc players, video cameras, game modules, or the like. The user can access these inputs and devices through a multi-function remote control.

The multitude of television channels and other devices accessible in a convergence system can be overwhelming. For example, a user of such information can find it very difficult to remember information about many channels and events. Additionally, "surfing" through the channels and events can be both time consuming and distracting.

One problem encountered by multiple parties using a convergence system is that they each would like to watch a separate program at the same time. Although it is known in the art to be able to watch one channel while taping another channel for time-delay viewing, this typically requires the system to be so programmed in advance. If two parties are watching movie A, which appeals more to one viewer than the other, and the less interested viewer discovers that a more appealing program will be broadcast soon on another channel, the parties have limited options in prior art convergence systems. The parties can interrupt movie A while surfing for another program, and if they decide to record this other program to view later, they typically must interrupt movie A in order to set up the recorder. However, this is a limited solution at best, and poses an inconvenience to the viewer.

SUMMARY OF THE INVENTION

The present invention is directed to a convergence system that allows a user to display information on other channels or events without interrupting the present program and to program the system with this display information.

One aspect of the present invention involves a convergence system suitable for accepting inputs from several television or personal computing sources. The sources can be output on a display. The convergence system is controlled by a multi-function controller suitable for providing a set of function commands. A processor is coupled to the inputs, display and operably coupled to the controller wherein the processor responds to the function commands provided by the controller. The processor also creates a set of channel banners for output on the display. At least one of the channel banners provides information on available processor functions and provides video feedback when the processor is responding to the function commands.

Another aspect of the present invention is an information handling system. The information handling system includes a graphical user interface in an operating environment. The graphical user interface is configured to provide at least one display which includes information related to at least one channel. The display includes a prompt corresponding with at least one function related to the at least one channel. In another aspect of the present invention, the information handling system is implemented through a machine readable medium, such as a piece of software, or a method.

The present invention includes many advantages. Among these is the ability to program the system directly through the channel banner. Thus, the channel banner becomes an interactive component and saves the user steps when programming the device. Also among the advantages includes the opportunity to "surf" the contents of channels or events without having to interrupt the event being watched, which is a great convenience when one viewer is particularly interested in a program and another is not. This feature provides for subsidiary benefits such as the ability to record without interruption the event being watched while "surfing" channel and event contents. In addition to the opportunity for providing information on channels or events while watching another channel, the present invention provides the opportunity for programming functions on the channels not being watched. Thus, the viewer of one channel can program a recorder to record another channel or event without interrupting the first channel, which is a great convenience when a viewer or viewers are interested in two, or more, overlapping events. Further, the channel banners provide more than just information, the channel banners now provide the ability to program the device. Prior art systems required the user to leave the channel banner scheme to program the system, thus creating an inconvenience.

The present invention describes convergence systems, computers, computer-readable media and methods of varying scope. Still other and further aspects, advantages and embodiments will be described in the detailed description of the preferred embodiments with reference to the accompanying drawings.

BRIEF DESCRIPTION OF THE DRAWINGS

FIG. 3 is a functional block diagram of a system embodying features of the present invention.

DETAILED DESCRIPTION OF THE PREFERRED EMBODIMENTS

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the appended claims.

Figure 1A:
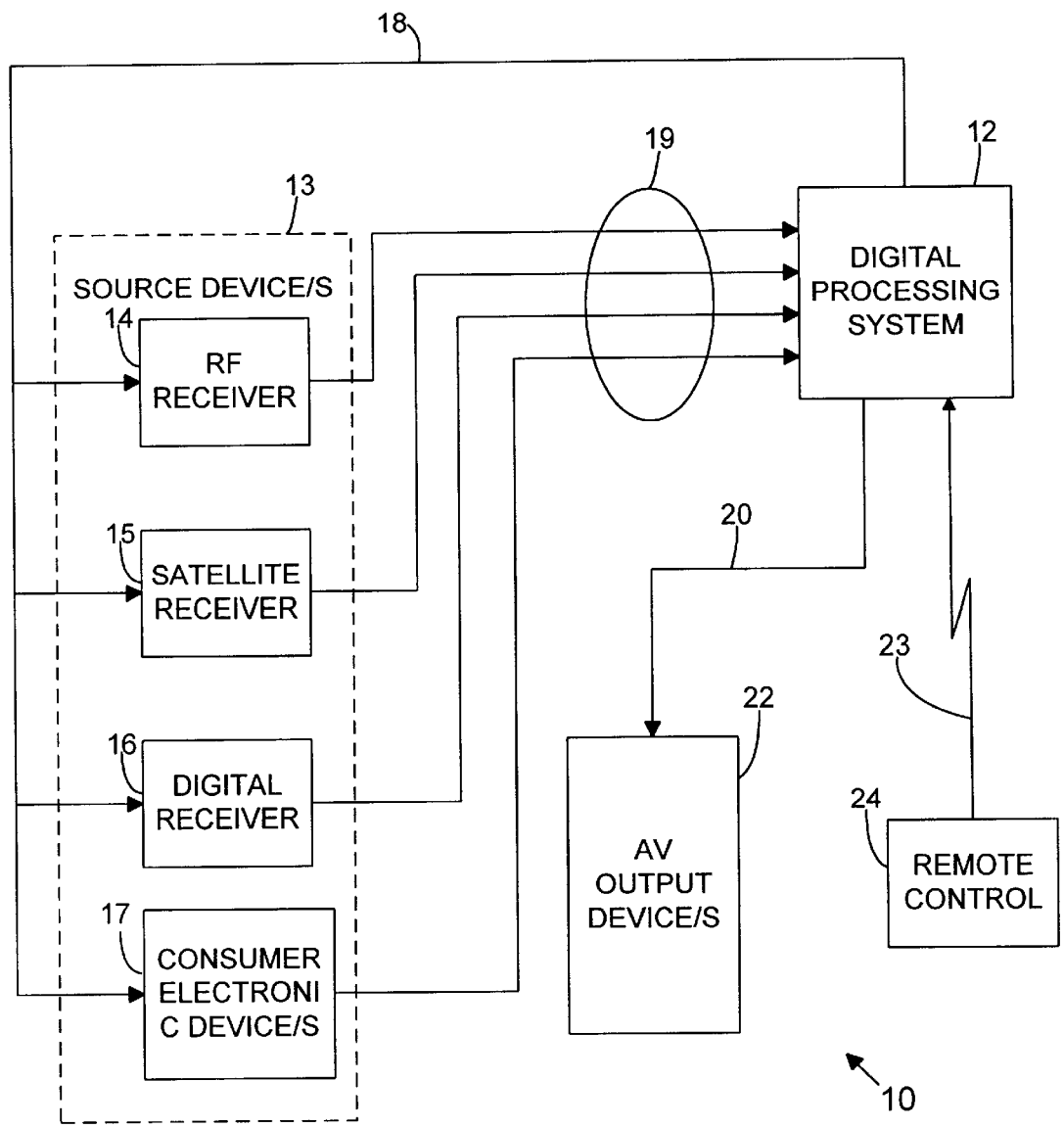
FIG. 1A is a schematic diagram of a system context suitable for incorporating the teachings of the present invention.

FIG. 1A shows a schematic diagram of an exemplary system context 10 suitable for incorporating the teachings of the present invention. System 10 includes a digital processing system 12, which can be in the form of a personal computer or other suitable processing apparatus. In one embodiment, The digital processing system 12 may be communicatively connected to a CD-ROM player or to a wide area network such as the Internet. System 10 also includes a plurality of source devices 13 such as a radio-frequency receiver 14, a satellite receiver 15, and a digital receiver 16, and consumer electronic devices 17 such as a video cassette recorder, digital video disc (digital versatile disc), laser disc, video camera, or the like. The source devices 13 typically can be configured to receive inputs as well as provide outputs. The above described components can be collectively considered to be source devices 13 in that they provide the channels or events to the convergence system 10. Those skilled in the art know that a convergence system can include additional or cumulative source devices 13 or subsets or permutations thereof. Additionally, system 10 includes an audio-video output component 22 that may include a monitor (display), speakers, and associated elements, and an input component 24, that can take the form of the commonly referred to "remote control," which may include a pointing device such as a mouse, a keyboard, or the like, for inputting a plurality of user-desired functions.

The system 10 can be suitably coupled together in a variety of configurations. For example, FIG. 1A shows a system where the processor 12 is a hub and all other elements, i.e. source devices 13 and output 22, are connected through the processor 12. The source devices 13 are individually connected through the processor 12 and receive inputs from the processor 12 along a source device control signal line 18, and provide inputs to the processor 12 along source input signal lines 19. All controls of the source devices 13 are provided through the processor 12 also, and thus the remote control 24 provides inputs to the processor 12, rather than the source devices 13, as indicated along 23, which may be a wireless or a physical connection. The output 22 is connected to and controlled by the processor 12 along line 20.

Figure 1B:
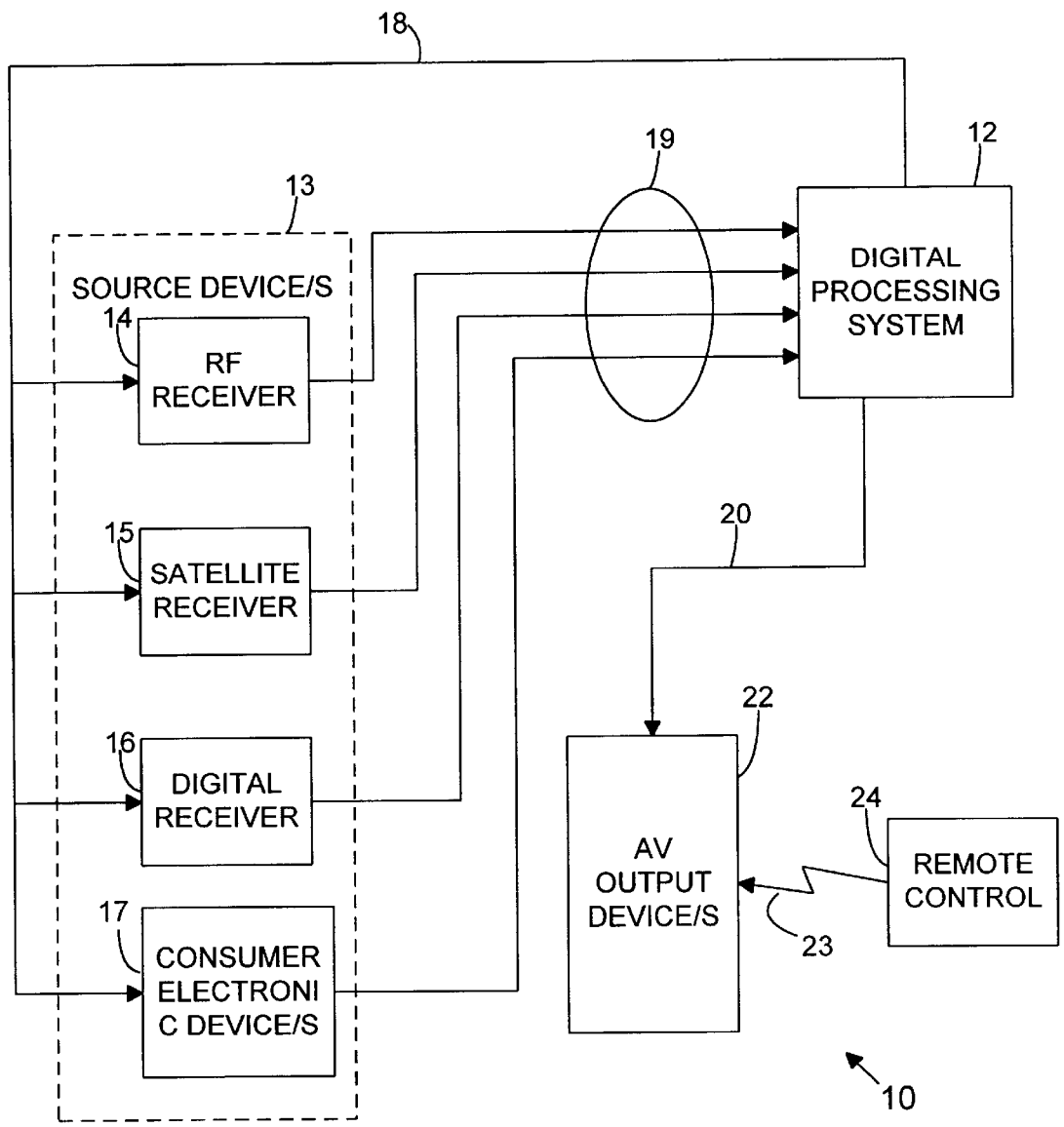
FIG. 1B is another schematic diagram of a system context suitable for incorporating the teachings of the present invention.

FIG. 1B shows the components of system 10 coupled in an arrangement similar to that shown in FIG. 1A. However, the remote control 24 provides a signal 23 to the output 22 rather than the processor 12. The output 22 is in two way communication with the processor 12 along line 20 (not shown in FIG. 1B). Thus, the input signals from the remote control 24 are provided to the processor 12 through the output 22.

Figure 2A:
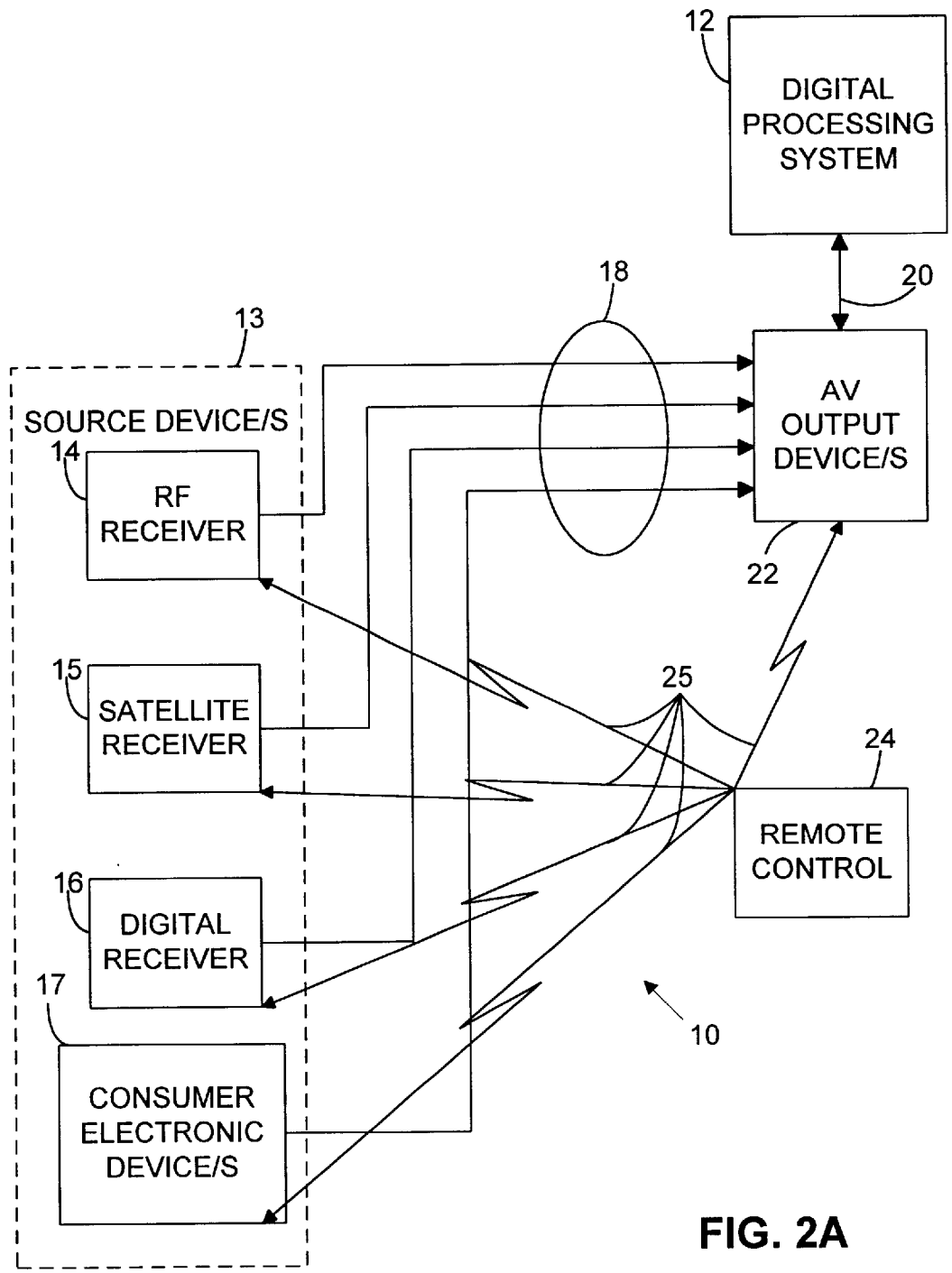
FIG. 2A is another schematic diagram of a system context suitable for incorporating the teachings of the present invention.

FIG. 2A shows the components of the system 10 coupled in an arrangement which differs from the embodiment shown in FIGS. 1A and 1B. However, like elements are referred to by like reference numerals. In the connections shown in FIG. 2A, the processor 12 is not the hub of the system 10. Instead, the input device 24 directly controls the source devices 13 and the output 22, as indicated in connections 25 which may be physical or wireless. Further, the source devices 13 are connected directly to the output 22, rather than through the processor 12. Specifically, the source input signals 18, connected to the processor 12 in FIG. 1, are now directly connected to the output 22. In the embodiment shown in FIG. 2A, source device control signal lines 18 remain connected between the processor 12 and the source devices 13. In each of the described configurations, the electrical connections can be physical or wireless.

Figure 2B:
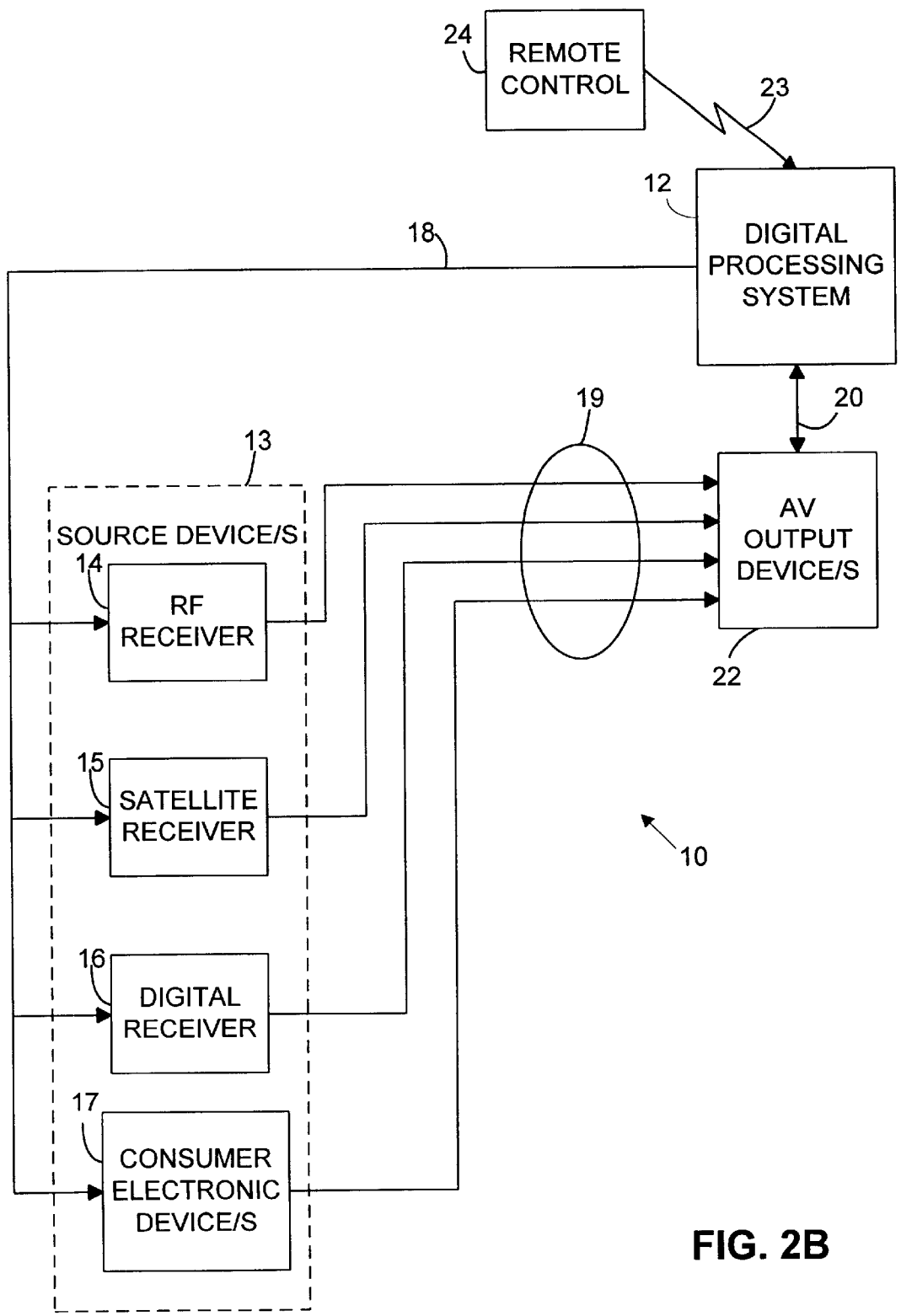
FIG. 2B is still another schematic diagram of a system context suitable for incorporating the teachings of the present invention.

FIG. 2B shows an alternate configuration to the system 10 shown in FIG. 2A. Specifically, the remote control 24 provides only one signal 23, and this signal is directed to the processor 12, which performs the functions on the system. Those skilled in the art now know that alternative configurations are available. For example, the processor 12 can act as a hub for some of the source devices 13, whereas others can be directly controlled by the input device 24 and directly provide input signals to the display 22. Also, some source devices 13 can be directly connected to one of the input device 24 or the display 22, but connected through the processor 12 for the other of the input device 24 and the display 22. For example, the input device 24 can operate directly on the processor 12, output 22, or the output 22 and source devices 13. These connections are merely examples, and other connections are included within the scope of the present invention.

The system 10 is coupled together to form what is known in the art as a convergence environment such that system 10 provides capabilities beyond ordinary personal computer or television operation. For example, the Gateway Destination PC/TV system, available from Gateway 2000, Inc., of North Sioux City, S. Dak., provides such a convergence environment. Embodiments of the present invention are amendable to inclusion into a software architecture of a computerized convergence system as described in co-filed application entitled "Architecture for Convergence Systems," which is hereby incorporated by reference. Briefly, the computerized convergence system includes views, overlays and system services. The views provide a graphical user interface which may be associated with a particular application. An example of a view is a full-screen television window in which a television program or the like may be viewed. The overlays provide a partial graphical user interface cooperating with and consistent over the views. An example of an overlay is a channel banner which displays the current channel and information on other channels. The system services provide common functionality or user interfaces shared by the views and overlays.

FIG. 3 shows a functional block diagram of the major components of an embodiment of the present invention. System 30 includes four major components such as a user interface component 32, a television services component 34, an electronic program guide (EPG) content services component 36, and function related services component 38 connected to each other as shown. The television services component 34 functions to select various source devices 13 for display and output on the monitor and speakers 22 and tunes to channels on these devices. The function related services component 38 operates for purchasing pay events, watching events, recording events, locking events, scheduling reminders, adding channels to "favorite" lists, and other functions related to channels and events.

The EPG content services component 36 functions to retrieve a database 40 which includes events and channels from in-band program guides or out-of-band program guides and loads electronic program guide type data from data services. Such data services may be communicated through a modem, over the Internet, over a satellite, through a vertical blanking interval of a television program, or the like. Database 40 also provides an application programming interface for accessing the data and common user interface for configuring loading functions. The EPG data services may be used to determine what is programmed to be on television on a channel at a given time, the EPG data services may then call channel map services to determine the corresponding channel and device, and then load relevant EPG if necessary before returning the requested information to the application.

The user interface component 32 provides overlays that display channel and event information as obtained from the EPG content services component 36 via the monitor of the output component in accordance with the video output from the television services function 34. In one embodiment of the invention, an overlay includes currently selected channel and event information. Additionally, a second overlay can be provided to include event information for channels other than that which correspond with the video. The second overlay can include information for a user selected channel at a user-selected time. The second overlay can provide feed-back for user-selected functions which permit the user to access the function-related services component 38 with a remote control 24. For example, the second overlay can be used to "surf" for information on channels and events and to program a video cassette recorder to record any selected channel, all without interrupting the current event.

Figure 4:
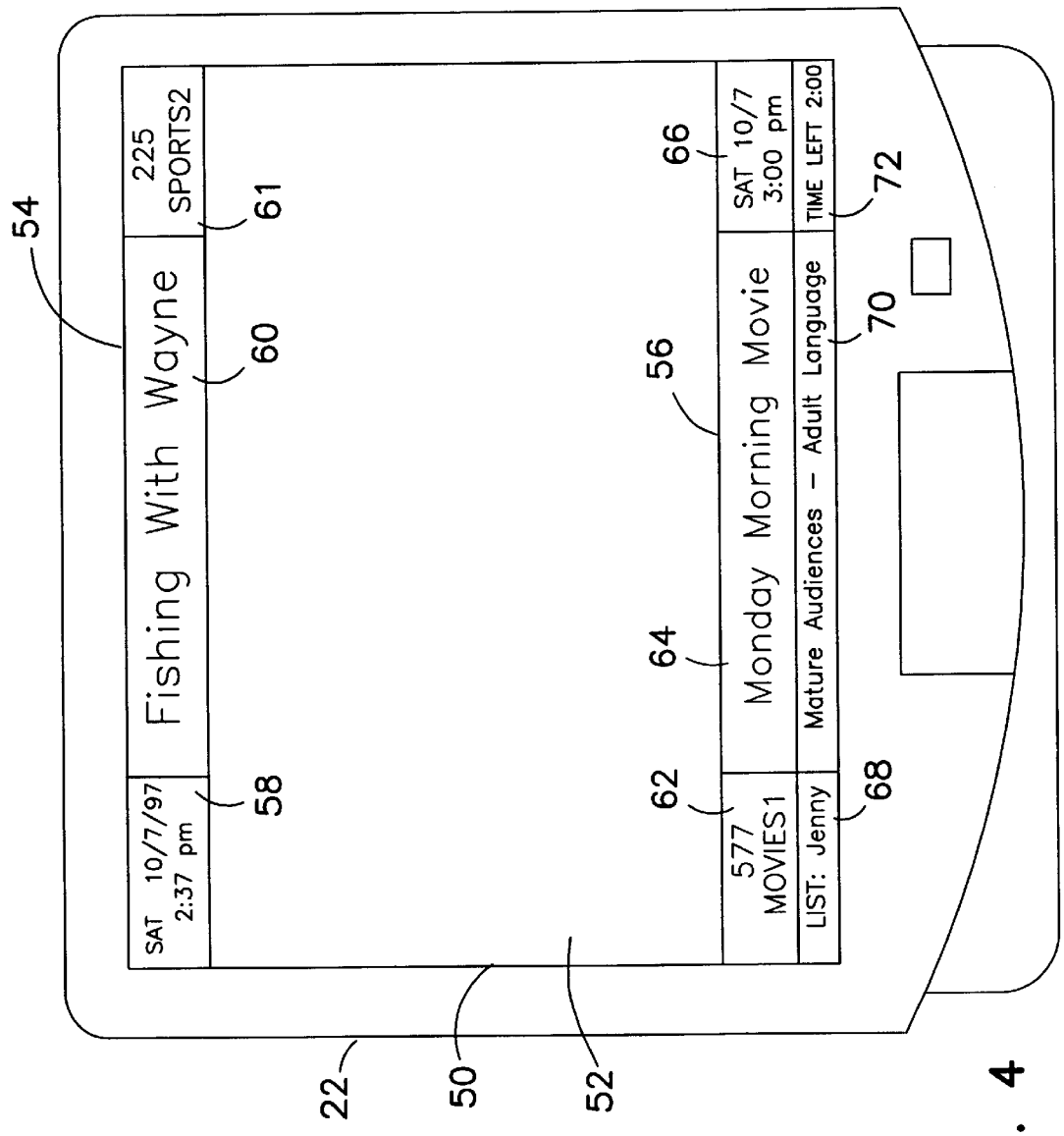
FIG. 4 is a schematic view of a screen generated by the system shown in FIG. 3.

FIG. 4 shows a schematic example of a screen 50 as provided by system 30 and output on a monitor of the output component 22. Screen 50 includes a video 52 as provided from a source device 13, or the like, through television services component 34. Also, screen 50 includes overlays in the form of a channel banner 54 and a browse banner 56. The channel banner 54 includes a plurality of fields such as date/time field 58, current event field 60, and current channel field 61. The browse banner 56 includes browsing channel field 62, browse event field 64, browse start time field 66, favorite list field 68, rating field 70, and browse time field 72.

The channel banner 54 includes information regarding a current event, i.e., the event which appears on the video at any given time. Date/time field 58 includes such information as the current date and time and is maintained continuously. Current event field 60 includes such information as the name of the current event. Current channel field 61 includes such information as the channel name and number of the current event. The information provided in the channel banner 54 changes with time and with the current event such that it corresponds with the current date, time and event that appears on video 52.

The browse banner 56 includes information regarding events that correspond with a selected channel when the system is in a browse mode. The user selects the browse mode with the remote control and can access information regarding a given channel or event through the browse banner 56 without interrupting the current event. The browsing channel field 62 includes such information as the selected channel number and logo. The browse event field includes such information as the name of the event that corresponds with the selected channel and time in browsing channel field 62. The browse start time field 66 includes such information as the start time of the browse event. The favorite list field 68 includes such information as a currently active favorite list. The rating field 70 includes such information as the parental rating and content of the browse event. Finally, the browse time field 72 includes such information as the time remaining in the browse event. The described fields are merely exemplary, and those skilled in the art now know that other fields may be added or substituted in the overlays 54 and 56.

Figure 5:
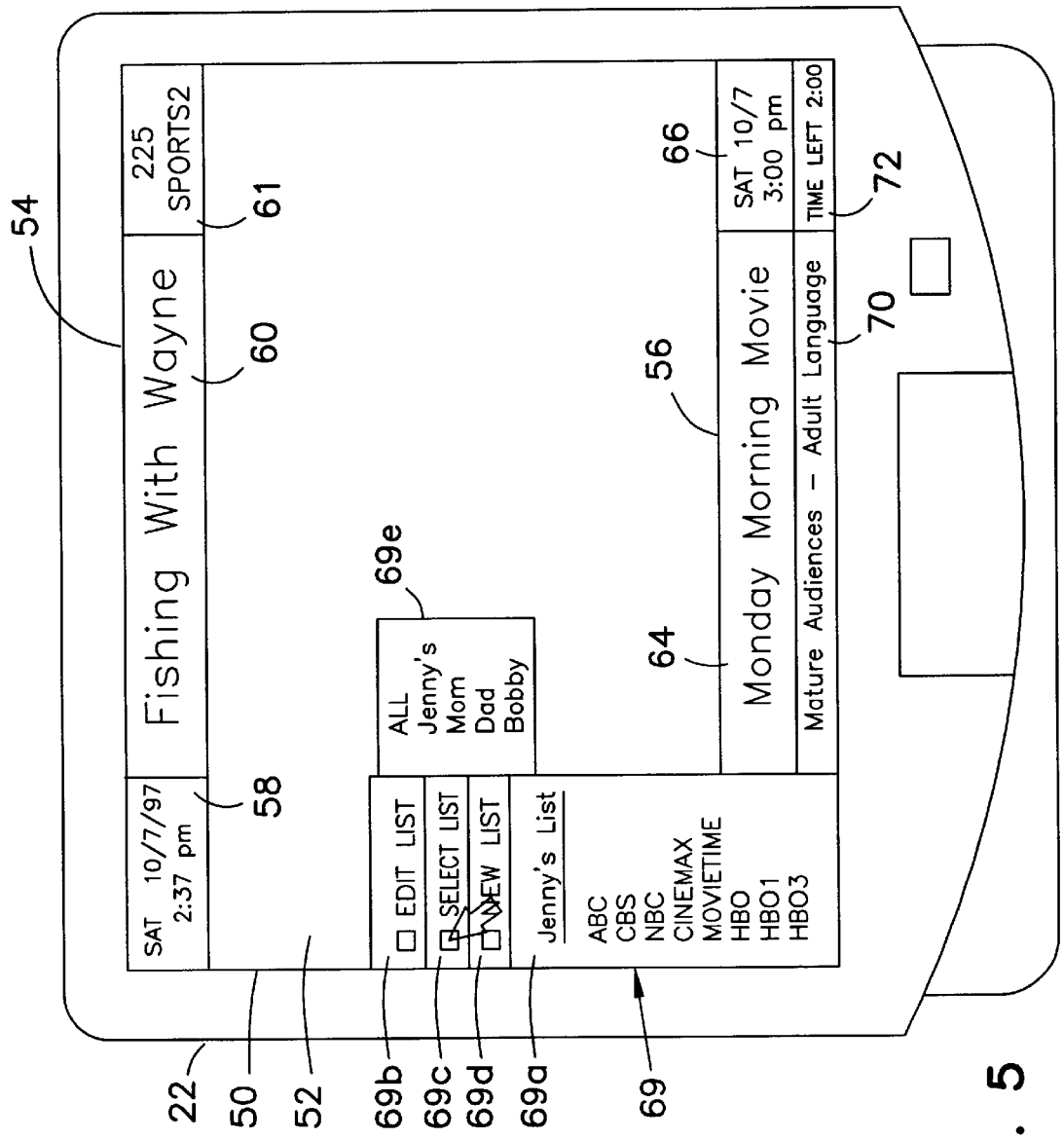
FIG. 5 is another schematic view of a screen generated by the system shown in FIG. 3.

FIG. 5 another schematic example of screen 50 and an example of the operation of system 30. In the example, a viewer has selected favorite list field 68 with a pointing device in the remote control 24. The selected field 68 includes several menu-type items 69, including a list of the channels 69a which correspond with the currently active favorite list, an edit list 69b which enables a user to add or delete channels from the currently active favorite list, a select list 69c which enables the user to change the currently active favorite list to another active list, and a new list 69d which enables the user to create a list in addition to the existing active lists. Items 69a–d may include sub-items. For example, the viewer can activate select list 69c and a sub-item list 69e will appear indicating all of the active favorite lists. From this group, the user can select one of the active lists with the pointing device in the remote control 24 in a manner know to those skilled in the art. Thus, through the use of the channel banner, the user can quickly and easily program the functions of the system.

Figure 6:
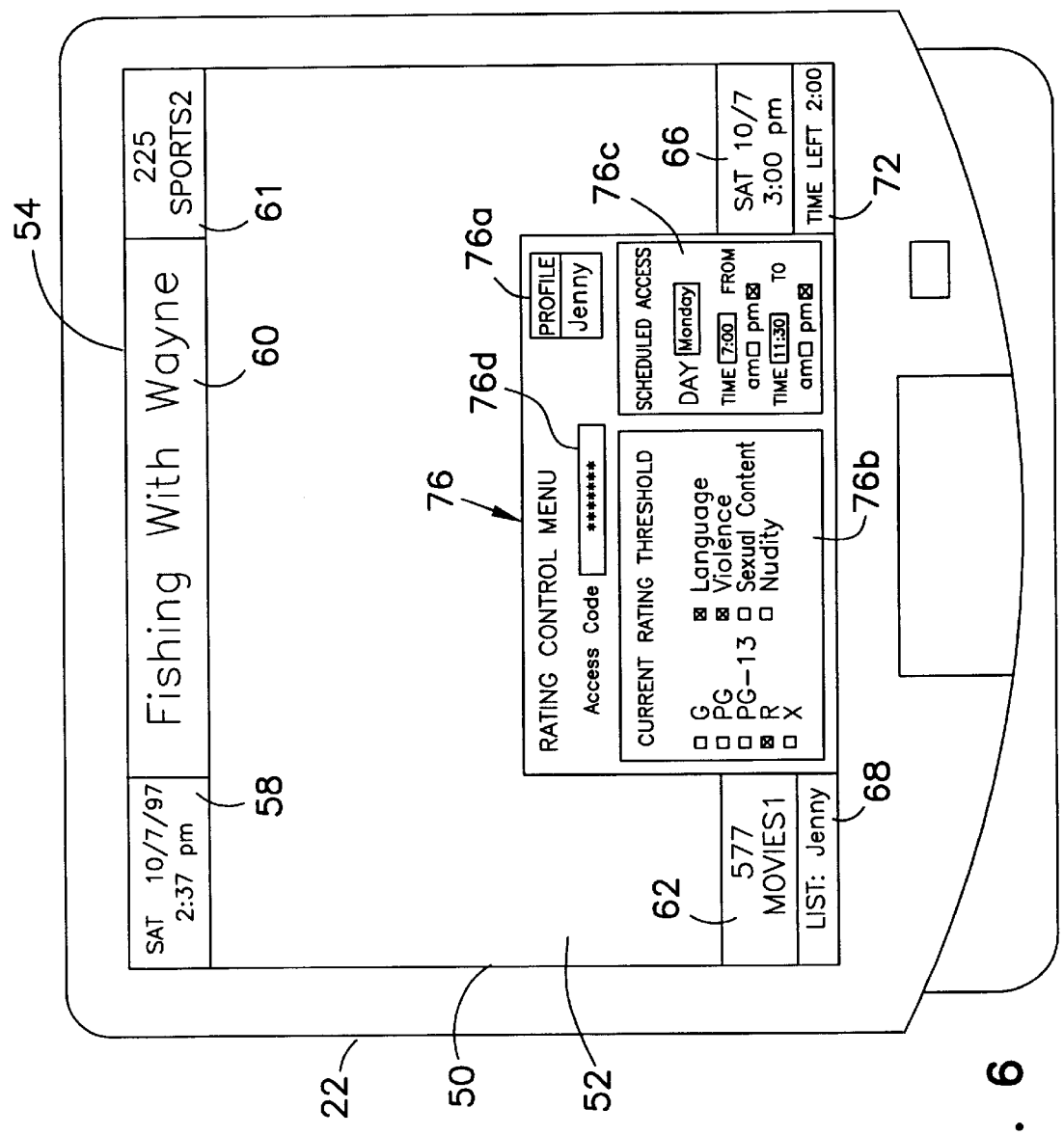
FIG. 6 is a schematic view of a screen generated by the system shown in FIG. 3.

Another example of the programming feature is shown in FIG. 6, which is still another example of the screen 50. In this example, a user of the system has activated a rating control menu 76 for a particular viewer. The rating control menu 76 can be activated by selecting the rating field 70 with a pointing device, and the rating control menu 76 can initially correspond with the viewer described in favorite list field 68. The rating control menu 76 permits a user to control on-screen the channels and events accessed by a selected viewer, indicated in profile 76a. In the example shown, the rating control menu 76 includes a current rating threshold 76b. The current rating threshold 76b allows the user to select the limits of predetermined content thresholds for the viewer indicated in the profile 76a. For instance, the user may select limits in terms of "ratings" assigned to programs (and indicated in the rating field 70, shown in FIG. 4), in terms of the program content, or both. Also, the user may limit the access of the viewer indicated in the profile to specific times during the day in the scheduled access field 76c. In order to make changes, the user must input a preselected access code, shown schematically at 76d. Thus, all the functions are all accessible through the channel banner 54.

Figure 7:
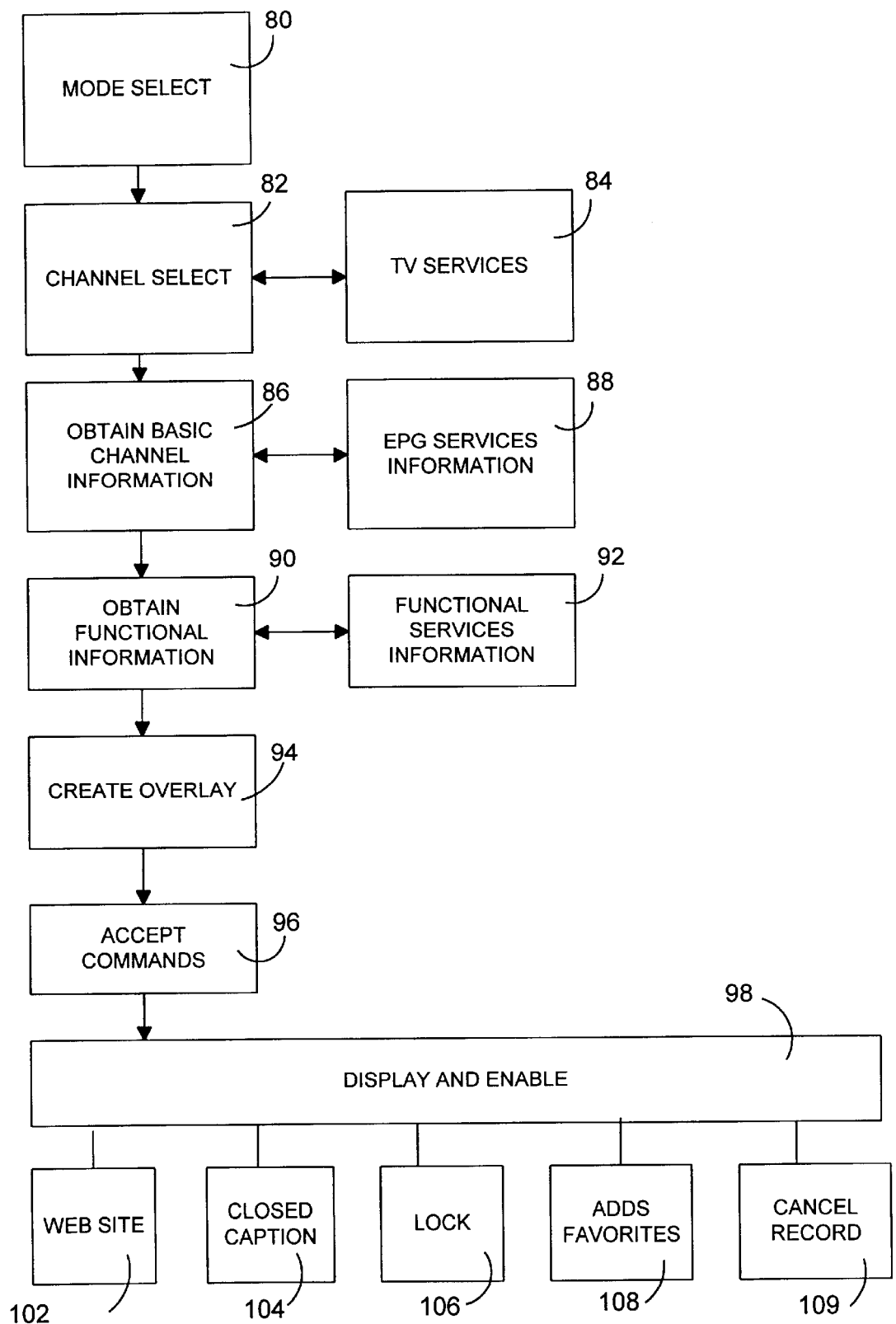
FIG. 7 is a flow diagram of a method embodying features of the invention.

FIG. 7 shows a block diagram of the operation of system 30. In order to perform functions on either the current event or on a channel or event brought up on the browse banner, a mode is selected 80. If the current event mode is selected, the following steps are performed on the current event. On the other hand, if the browse mode is selected, the following steps are performed on the channel or event which corresponds with that supplied to the browse banner.

The user selects a particular channel 82 with the remote control, or the like, and the system obtains the channel from television services and provides it to the user interface 84. The user can select a channel either by its name or channel number. The system then updates the user interface with basic information regarding the selected channel 86 with data provided by the EPG content services 88. Such basic information includes the name of the event, the parental rating of the event, whether a web site, close captioning, or alternate audio simulcast are available, etc. The system then updates the user interface with functional information regarding the selected channel 90 with data provided by the function related services 92. Functional information can include any pre-stored information regarding the selected channel, time or event, etc. For example, functional information can include an indication of whether the selected channel is parentally locked, whether a favorite list is active, or whether the particular event is being recorded. This information is provided to the user in the form of an overlay 94. The system then prepares itself to accept commands from the remote control and provide video feedback in the form of overlays 96.

Additionally, the display and enable controls are provided as overlays in order to prompt the user and provide video feedback of the controls 98. For example, a web control is displayed and enabled if there is an associated web site for the channel or event 102. Thus, the user of the system can easily access the web site. Also, a closed captioning control is displayed and enabled if the event is closed captioned 104. A lock channel is displayed and enabled if a channel has not previously been locked or its access otherwise prevented 106. An add favorite control is displayed to permit the user to add a particular channel to the list of favorites 108. If a channel or event is being recorded, a cancel record control is enabled 109. Those skilled in the art can recognize that this list is not meant to be exhaustive, and other controls or functions may be added to or substituted with the ones described.

Although the present invention has been described with reference to preferred embodiments, workers skilled in the art will recognize that changes may be made in form and detail without departing from the spirit and scope of the invention.

What is claimed is:

1. An information handling system, comprising:
   a graphical user interface in an operating environment, the graphical user interface configured to provide at least one display including information related to at least one channel wherein the display includes a prompt corresponding with at least one function related to the at least one channel, wherein the display includes a current banner displaying channel and title information for the at least one channel and a separate browse banner displaying channel and title information for a second channel, and further wherein the current banner is displayed concurrently with the browse banner.

2. The information handling system of claim 1 wherein the display further includes an on-screen display that combines the current banner and the browse banner with a broadcast streaming video.

3. The information handling system of claim 1, and further comprising a tuner operably coupled to the graphical user interface, wherein the tuner is tunable to a plurality of channels including the at least one channel.

4. The information handling system of claim 3 wherein the plurality of channels includes at least one event.

5. The information handling system of claim 1, and further comprising a convergence system operably coupled thereto.

6. The information system of claim 1, wherein the function related to the at least one channel comprises setting a rating threshold.

7. A medium having executable instructions stored thereon for execution on a suitably equipped electronic system, the instructions for causing the electronic system to perform a method, the method comprising the steps of:
   generating a display including a current banner displaying channel and title information for at least one channel concurrently displayed on the display and a separate browse banner displaying channel and title information for at least one separate channel, wherein the display includes information related to the at least one separate channel, and further wherein the current banner is displayed concurrently with the browse banner;
   prompting, with the display, a function related to the at least one separate channel.

8. The medium of claim 7 wherein the suitably equipped electronic system includes a convergence system.

9. The medium of claim 7 wherein the electronic system receives a plurality of channels.

10. The medium of claim 9 wherein the plurality of channels includes an event.

11. The medium of claim 7, wherein the function related to the at least one separate channel comprises setting a rating threshold.

12. A system, comprising:
   means for generating a display, the display including a current banner displaying channel and title information for at least one channel concurrently displayed on the display and a separate browse banner displaying channel and title information for at least one separate channel, wherein the current banner is displayed concurrently with the browse banner; and
   means for providing at least one prompt in the display, the prompt corresponding with at least one function related to the at least one separate channel.

13. The system of claim 12, and further comprising means for selecting the at least one separate channel from a plurality of available channels wherein the available channels include events.

14. The system of claim 12, and further comprising means for receiving the information related to the at least one separate channel.

15. The system of claim 12, and further comprising means for performing the function related to the at least one separate channel.

16. The system of claim 12, wherein the function related to the at least one separate channel comprises setting a rating threshold.

17. A method for use with an information handling system, the method comprising the steps of:
   generating a display including a current banner displaying channel and title information for at least one channel concurrently displayed on the display and a separate browse banner displaying channel and title information for at least one separate channel, and wherein the display includes at least one prompt; and
   receiving a command in response to the prompt wherein the command corresponds with at least one function related to the at least one separate channel.

18. The method of claim 17, and further comprising the steps of:

generating a video output; and selecting one of a current event mode wherein the video output corresponds with the at least one channel, and a browse mode wherein the video output does not correspond with the at least one separate channel.

19. The method of claim 18, and further comprising the step of receiving a plurality of channels, wherein the plurality of channels includes at least one event.

20. The method of claim 17, wherein receiving a command in response to the prompt receives a rating setting command.

* * * * *